US008056350B2

(12) United States Patent
Minds et al.

(10) Patent No.: US 8,056,350 B2
(45) Date of Patent: Nov. 15, 2011

(54) COOLING APPARATUS FOR AIR CONDITIONING AND HEAT PUMPS

(75) Inventors: Gunnar Minds, Højbjerg (DK); Søren Minds, Arhus (DK); John Steen Jensen, Hinnerup (DK)

(73) Assignee: AC-Sun ApS, Viby J (DK)

( * ) Notice: Subject to any disclaimer, the term of this patent is extended or adjusted under 35 U.S.C. 154(b) by 716 days.

(21) Appl. No.: 11/992,467

(22) PCT Filed: Sep. 28, 2006

(86) PCT No.: PCT/DK2006/000532
§ 371 (c)(1),
(2), (4) Date: Mar. 21, 2008

(87) PCT Pub. No.: WO2007/038921
PCT Pub. Date: Apr. 12, 2007

(65) Prior Publication Data
US 2009/0266096 A1    Oct. 29, 2009

(30) Foreign Application Priority Data
Oct. 4, 2005   (DK) .................................. 2005 01385

(51) Int. Cl.
*F25B 27/00*    (2006.01)
*F25D 9/00*    (2006.01)
*F01K 25/02*    (2006.01)

(52) U.S. Cl. ................. 62/235.1; 62/87; 62/88; 62/116; 62/402; 62/501; 62/513; 62/910; 60/641.8; 60/650; 60/653; 60/655; 60/670

(58) Field of Classification Search ................. 62/135.1, 62/402, 910, 498, 235.1, 116, 87, 88, 501, 62/513; 60/655, 653, 641.8, 670, 650
See application file for complete search history.

(56) References Cited

U.S. PATENT DOCUMENTS 3,213,640 A * 10/1965 Dubinsky et al. ............... 62/402
4,522,636 A *  6/1985 Markbreiter et al. ............. 62/87
(Continued)

FOREIGN PATENT DOCUMENTS
WO    WO 02/053877    7/2002
(Continued)

Primary Examiner — Frantz Jules
Assistant Examiner — Cassey D Bauer
(74) Attorney, Agent, or Firm — James Creighton Wray (57) ABSTRACT

An apparatus for cooling, comprising: a liquid pump for transport of fluid through a heating cycle, an external heat source for heating the fluid in the heating cycle, for example a solar heater directly connected to the heating cycle or connected through a heat exchanger, an expander with an expander inlet and an expander outlet, the expander inlet having a fluid connection to the external heat source for receiving fluid in the gas phase to drive the expander by expanding the fluid, a compressor with a compressor inlet and a compressor outlet, the compressor being driven by the expander for compressing working fluid from a low pressure compressor inlet gas to a high pressure compressor outlet gas, a first heat exchanger with a fluid connection to the compressor outlet and connected to the expander inlet for transfer of heat from the high pressure compressor outlet gas to the fluid in the heating cycle, a second heat exchanger with a condenser for condensing the working fluid from the expander by energy transfer to a second fluid of lower temperature, for example ambient air, a third heat exchanger with evaporator for evaporating the working fluid from the second heat exchanger by energy transfer from a third fluid and for creating a desired cooling effect in the third fluid. Particularly, according to the invention, the first heat exchanger is connected to the heating cycle between the external heat source and the expander inlet.

19 Claims, 10 Drawing Sheets

U.S. PATENT DOCUMENTS

| | | | |
|---|---|---|---|
| 4,984,432 A * | 1/1991 | Corey | 62/87 |
| 6,581,384 B1 | 6/2003 | Benson | |
| 2003/0000213 A1 | 1/2003 | Christensen et al. | |

FOREIGN PATENT DOCUMENTS

| | | |
|---|---|---|
| WO | WO 2005/024189 | 3/2005 |

* cited by examiner

COOLING APPARATUS FOR AIR CONDITIONING AND HEAT PUMPS

This application claims the benefit of Danish Application No. PA 2005 01385 filed Oct. 4, 2005 and PCT/DK2006/000532 filed Sep. 28, 2006, which are hereby incorporated by reference in their entirety.

FIELD OF THE INVENTION

The present invention relates to air conditioning systems powered by solar heaters. Especially, it relates to an apparatus for cooling, comprising
- a liquid pump for transport of fluid through a heating cycle,
- an external heat source for heating the fluid in the heating cycle,
- an expander with an expander inlet and an expander outlet, the expander inlet having a fluid connection to the external heat source for receiving fluid in the gas phase to drive the expander by expanding the fluid,
- a compressor with a compressor inlet and a compressor outlet, the compressor being driven by the expander for compressing working fluid from a low pressure compressor inlet gas to a high pressure compressor outlet gas,
- a first heat exchanger with a fluid connection to the compressor outlet and connected to the expander inlet for transfer of heat from the high pressure compressor outlet gas to the fluid in the heating cycle,
- a second heat exchanger with a condenser for condensing the working fluid from the expander by energy transfer to a second fluid of lower temperature, for example ambient air,
- a third heat exchanger with evaporator for evaporating the working fluid from the second heat exchanger by energy transfer from a third fluid, such as the cooled air in a house, and for creating a desired cooling effect in the third fluid,

BACKGROUND OF THE INVENTION

The number of air conditioning apparatuses is rapidly increasing. Having regard to the world wide aim of reduction of carbon dioxide emission, a reduction of the energy consumption of such machines is of utmost importance.

Normally, the energy consumption for air conditioning is largest, when the sunshine is strong. Therefore, using solar energy for conversion to cooling of air is desirable. Especially, it is desirable to use common solar heating systems using water as working fluid.

A system proposed for using waste energy for air conditioning is disclosed in U.S. Pat. No. 6,581,384. This system applies liquids that have a low critical pressure and temperature, such as refrigerants. Though this system seems promising at first glance and the disclosure proposes use of solar heating, a more thorough analysis reveals that this system is not suitable for common solar heating systems, especially not if water is used as working fluid. This will be investigated in greater detail in the following.

Figure 1:
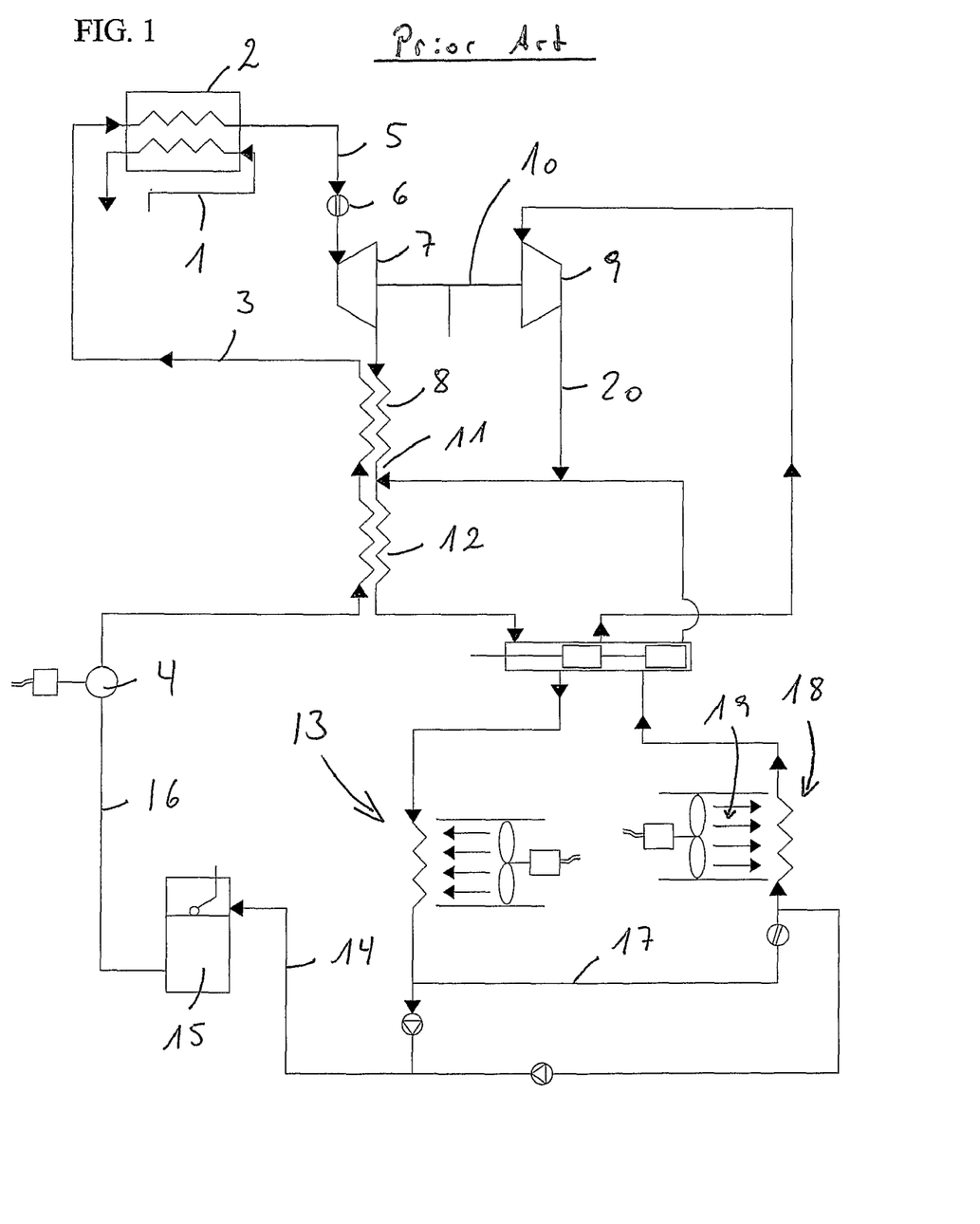
FIG. 1 is a diagram of the system in U.S. Pat. No. 6,581,384

FIG. 1 is a copy of the system disclosed in U.S. Pat. No. 6,581,384. A heat source 1, such as a solar heater, provides thermal energy that is transferred to a working fluid in a heat exchanger 2. The working fluid is provided in tube 3 under pressure provided by a liquid pump 4. By receiving thermal energy in the heat exchanger 2, the pressurized liquid is superheated. The superheated liquid is led by tube 5 and control valve 6 into an expander 7, where the liquid is expanded and transfers work from the working fluid into the expander. The working fluid is still superheated after leaving the expander 7 and part of the energy is in heat exchanger 8 transferred from the exit fluid of expander 7 to the working fluid in tube 3. Having received energy from the working fluid, the expander is driving a compressor 9 connected to the expander by a shaft 10. The compressor compresses the working fluid from a gaseous state to an intermediate pressure gas as part of a typical refrigeration cycle. The output fluid from the compressor 9 flows through tube 20 and is co-mingled at branch 11 with the outlet fluid from the heat exchanger 8. In order to extract more heat, a further heat exchanger 12 is used for energy transfer to the working fluid in tube 3. The remaining heat is to a large degree removed by ambient ventilated air cooling in condenser 13. The working fluid exits condenser 13 and is split, where part of the liquid passes through conduit 14 to refrigerant tank 15, where any residual vapour is separated from the liquid before entering the conduit 16 to the pressure pump 4. The other part of the working fluid after splitting follows conduit 17 to an evaporator 18, where the evaporation leads to a lowering of the temperature for uptake of energy from air 19 blown into a building at lowered temperature for air conditioning. The fluid from evaporator 18 is recirculated into the compressor 9.

In U.S. Pat. No. 6,581,384, it is disclosed that the expender receives working fluid of type R134a at a temperature of 400° F., corresponding to 204° C., in order to achieve a superheated fluid, which is illustrated in the reproduced cooling cycle in FIG. 2 being an enthalpy H versus pressure (log P) diagram. The cooling cycle A-B-C-D illustrates expansion A-B in the expander 7, condensing B-C in the condenser 13, pumping C-D in pump 4, and evaporation D-A in heat exchanger 2. Also shown is the cooling cycle for the other part of the split working fluid with evaporation F-E in evaporator 18.

Figure 2:
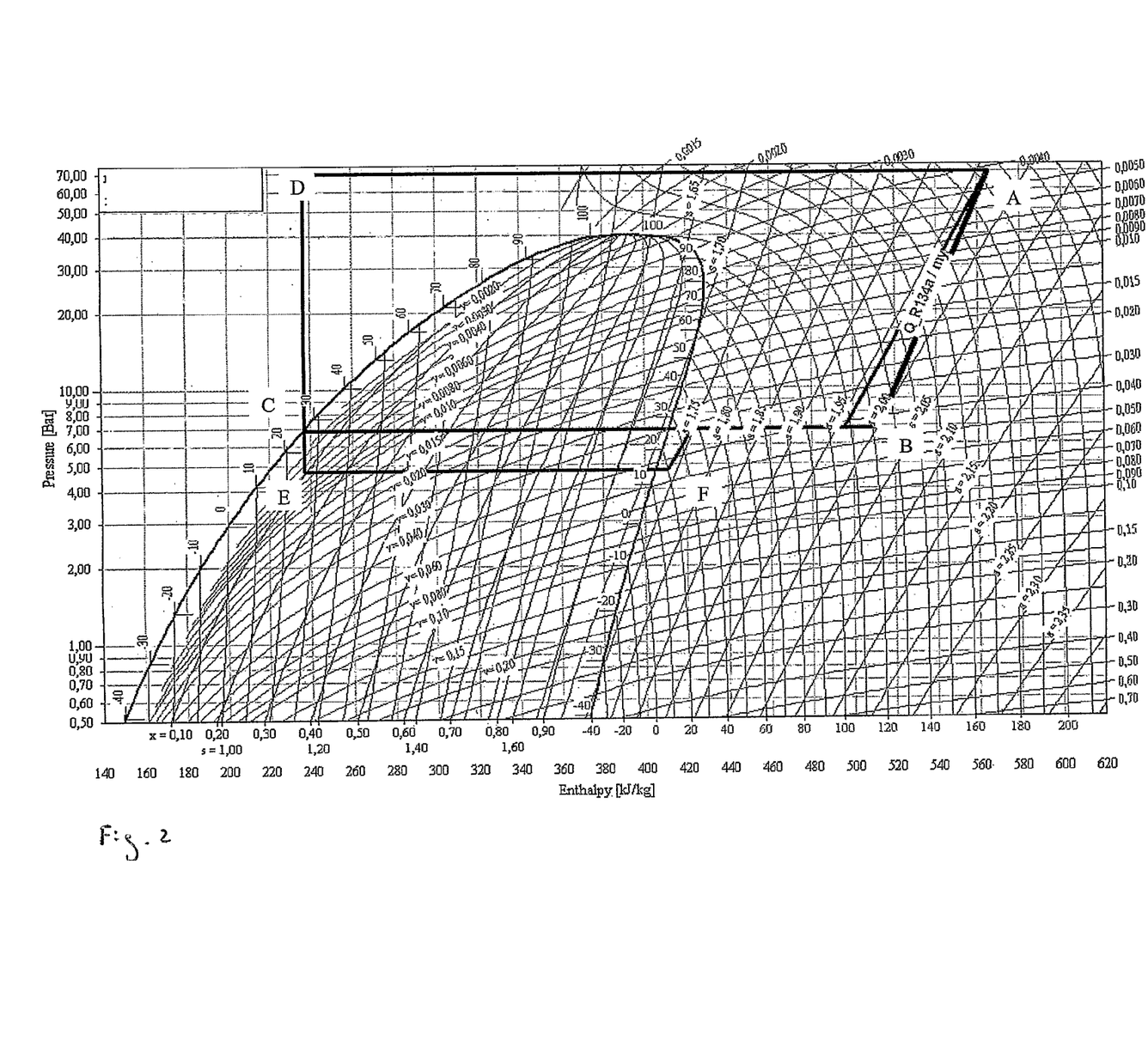
FIG. 2 is a H/log P diagram for the U.S. Pat. No. 6,581,384 system with R134a as a working fluid.

The high temperature of 204° C. of the working fluid is necessary at the expander 7 entrance in order to achieve a superheated fluid with a gaseous phase in the expander 7. The argument for the superheating is not clear from the disclosure but may be due to the fact that the inventor wants to guarantee that no droplets are formed under expansion in the expander, because this would damage the expander blades, as the expander drives at very high speed. The other advantage with a higher temperature on the working fluid is a higher COP value because of the exergy-effect. The Exergy-effect is defined as the energy transformation from a high temperature scale to a lower temperature scale.

The high temperature of 204° C. of the working fluid prevents the use of normal, commercial solar heaters, as these typically work at 70-120° C. and are not designed for such high temperatures of a working fluid.

Having regard to FIG. 2, the movement of point A in the diagram to, for example 140° C., would be an alternative, which is not mentioned in the disclosure of U.S. Pat. No. 6,581,384. However, also this would not be suitable for solar heaters due to a too high temperature.

Another critical point in U.S. Pat. No. 6,581,384 is the mechanical connection in the form of a shaft between the expander and the compressor, where a pressure difference between the expander outlet and the compressor inlet has to be taken into account. This requires a highly sophisticated mechanics, in as much as the shaft is driving at a very high speed. Solution according to prior art will normally reduce the efficiency of the machine.

The system of U.S. Pat. No. 6,581,384 is also not suited for water as a working fluid. This can be easily understood from FIG. 3. No matter the entrance pressure in the heat exchanger 2, the temperature from the solar heater would end at around 100° C. The expansion in the expander from A to B would then happen in the wet area, where liquid is not in the gaseous form, which would damage the expander. Alternatively, the apparatus of U.S. Pat. No. 6,581,384 could start at very low pressure at point A' or A" at 100° C., but this would not yield an optimized cooling performance in the end. As a conclusion, the system according to U.S. Pat. No. 6,581,384 is not suited for solar systems with water as a working fluid.

DESCRIPTION/SUMMARY OF THE INVENTION

It is therefore the object of the invention to provide a high performance air condition system fed with thermal energy from a solar heater.

This object is achieved with an apparatus for cooling, comprising
- a liquid pump for transport of fluid through a heating cycle,
- an external heat source for heating the fluid in the heating cycle, for example a solar heater directly connected to the heating cycle or connected through a heat exchanger,
- an expander with an expander inlet and an expander outlet, the expander inlet having a fluid connection to the external heat source for receiving fluid in the gas phase to drive the expander by expanding the fluid,
- a compressor with a compressor inlet and a compressor outlet, the compressor being driven by the expander for compressing working fluid from a low pressure compressor inlet gas to a high pressure compressor outlet gas,
- a first heat exchanger with a fluid connection to the compressor outlet and connected to the expander inlet for transfer of heat from the high pressure compressor outlet gas to the fluid in the heating cycle,
- a second heat exchanger with a condenser for condensing the working fluid from the expander by energy transfer to a second fluid of lower temperature, for example ambient air,
- a third heat exchanger with evaporator for evaporating the working fluid from the second heat exchanger by energy transfer from a third fluid and for creating a desired cooling effect in the third fluid.

Particularly, according to the invention, the first heat exchanger is connected to the heating cycle between the external heat source and the expander inlet.

According to the invention, heat is transferred to the fluid before entering the expander. Thus, liquid may be heated to a first temperature by the external heating source and to a second, higher temperature in the first heat exchanger. This implies more moderate requirements to the heating capabilities of the external heating source. For example, the first heating source may be a solar heater that heats and evaporates the fluid in the fluid cycle to a temperature in the order of 100° C. and a pressure of 1 bar, abs. After the external heater, the fluid may still be—at least partly—in the liquid phase and may then have its temperature increased in the first heat exchanger in order to achieve a gas phase before entering the expander.

The external heating source may provide a temperature to the fluid in the fluid cycle around 100° C., or lower or higher, for example between 70° C. and 120° C. or between 90° C. and 110° C., which makes the system suited for solar heaters and other facilities with rather low temperature. For example, waste water from central heating plants or from industrial plants may be used.

In addition, the apparatus according to the invention is suited for water as the working fluid.

Calculations have shown that the cooling performance in the case of the U.S. Pat. No. 6,581,384 is around 0.43. This means that a heat input of 1 kW yields a cooling power of 0.43 kW.

In the case of a solar heater used as an external heater, a cooling of performance (COP) of 1.25 or even higher can be achieved with the invention, which is in sharp contrast to the COP=0.43 of the system in U.S. Pat. No. 6,581,384. If as external heating source, waste water from central heating plants is used in connection with the invention, still a COP=0.9 can be achieved.

In another embodiment, the expander has a first expander stage and a second expander stage, and optionally even further stages, and there is provided heating means for transfer of heat to the gaseous fluid between the different expander stages. This may be used to increase the efficiency of the expander. For example, the heating means may be accomplished by a fourth heat exchanger having a downstream fluid connection to the first heat exchanger.

The two stage (or with even more stages) expander is used for reduction of the risk for wet expansion. The double compression results in sufficient outlet pressure for condensation even under tropical conditions.

In a further embodiment, a fluid connection to the outlet of the expander and a fluid connection to the outlet of the compressor are mutually connected though a valve, preferably a pressure reduction valve.

Advantageously, the valve is connected to the expander outlet fluid connection downstream of the second heat exchanger, and the valve is connected to the compressor outlet fluid connection upstream of the second heat exchanger.

In an even further embodiment, a fifth heat exchanger is provided for heat transfer from the fluid at the outlet of the compressor to the fluid at the inlet of the compressor. In this case as much heat from the compressor exit fluid is re-used in the warm part of the cooling cycle.

The heat exchanger is useful for achieving sufficiently high inlet temperature and exergy level at the inlets of the expander stages.

In a certain embodiment, a sixth heat exchanger is provided for heat transfer between the compressor outlet fluid connection and the working fluid upstream of the external heat source.

In a system according to the invention, the pressure can be kept below 2 atmospheres, or rather be 1.5 atmospheres at maximum. In the heating cycle, the pressure may, preferably, be around one atmosphere, making a direct connection to a commercial solar heater system possible.

The outlets on the expander and compressor are placed up against each other to minimize pressure differences on AC-Sun—referring to a critical point in U.S. Pat. No. 6,581,384.

The heat exchanger may also be a solar panel based on a parabolic solar collector or other waste heat producing a high fluid temperature up to 500° C. The high temperature from the parabolic solar collector may be heat changed to reach optimal inlet conditions to the expander.

Preferably, the expander is a turbine expander, for example with a rotational speed of between 50,000 and 250,000 rpm. A motor, preferably electrical, may be used for additional driving of the expander and the compressor.

The preferred working fluid is water, however, other working fluids may be used, for example, comprising isobutane, butane, ammonia, oil, Aspen Temper-20, Aspen Temper-40, Aspen Temper-55, calcium chloride, Dowtherm J, Dowtherm Q, ethanol, ethylene glycol, Freezium, magnesium chloride, calcium chloride, methanol, potassium carbonate, propylene glycol, sodium chloride, Syltherm XLT, Thermogen VP1869, Tyxofit, $N_2$, $CO_2$, coolant comprising HCFC, CFC or HC, R134a or R407 or combinations thereof.

Use of the invention includes air conditioning in buildings and vehicles, for example cars, trains, ships. In vehicles, the external heat source may be heat from the engine.

The cooling power of an apparatus according to the invention may vary over a large span, for example, it may have 10, 20 up till 50 kW.

When water is the refrigerant, the evaporation process in the apparatus according to the invention produces distilled water. This distilled water can be used to spray the condensers to make the energy transportation more efficient giving a higher COP.

The apparatus according to the invention is only intended for air conditioning and heat pumping.

The expander and/or the compressor may be of the axial or radial type of turbine or of a type combining the two principles.

SHORT DESCRIPTION OF THE DRAWINGS

The invention will be explained in more detail with reference to the drawing, where.

DETAILED DESCRIPTION/PREFERRED EMBODIMENT

FIG. 1 illustrates a system as disclosed in U.S. Pat. No. 6,581,384 and FIG. 2 illustrates the performance cycle of this system when using cooling fluid R134a. The system and the cycles are explained in detail in the introductory part of the description.

Figure 3:
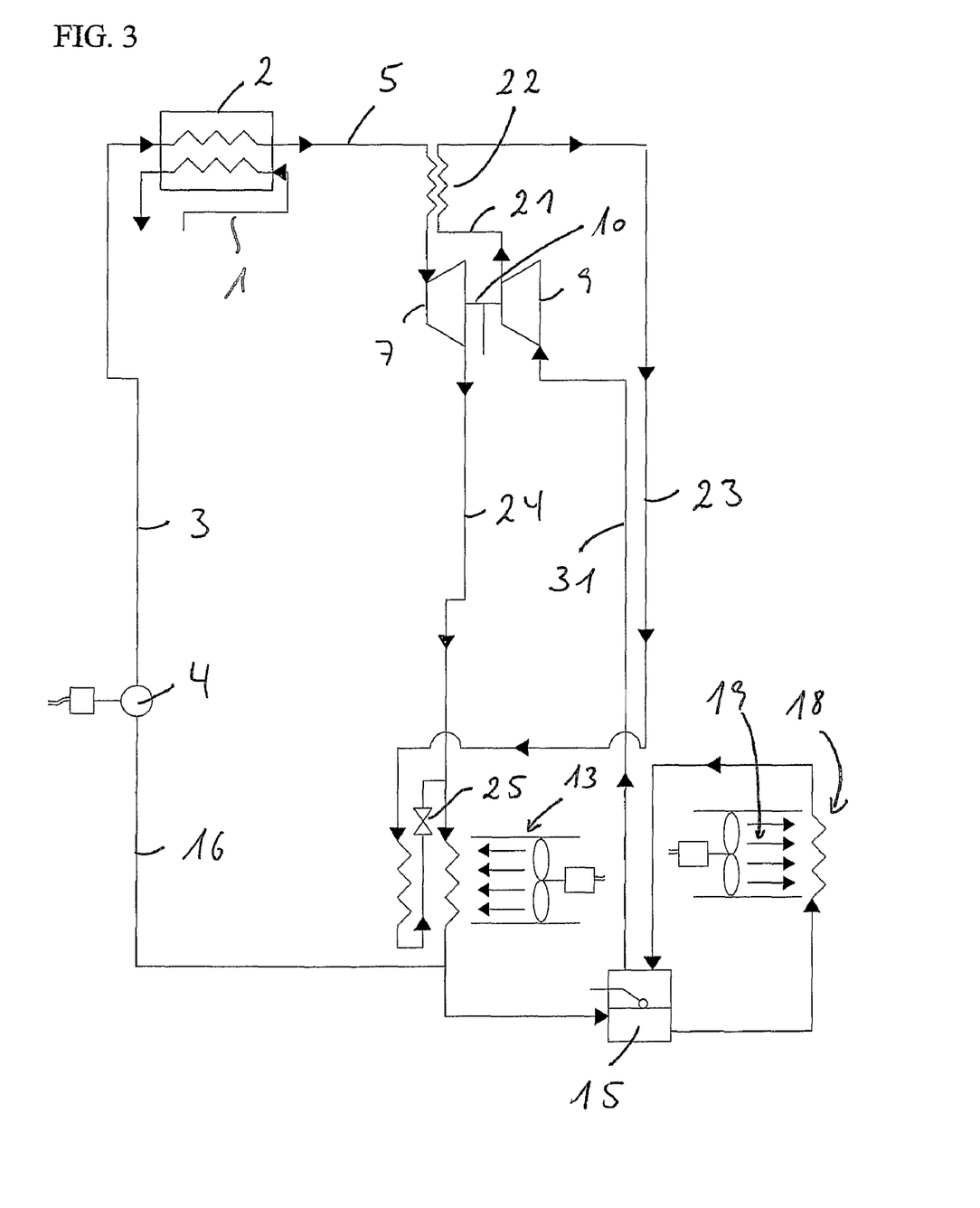
FIG. 3 is a diagram of a system according to the invention with one stage expander.

FIG. 3 illustrates a system according to the invention. A heat source 1, such as a solar heater or waste water from a heating plant, provides thermal energy that is transferred to a working fluid, preferably water, in a heat exchanger 2. The working fluid is provided in tube 3, for example under atmospheric pressure, from a liquid pump 4. The relatively low pressure of an atmosphere makes the system useful for solar heaters.

By receiving thermal energy in the heat exchanger 2, the pressurized liquid is heated, for example to 100° C. The heated liquid is led by tube 5 into expander 7, where the liquid is expanded and transfers work from the working fluid into the expander 7. The expander 7 may be a turbine expander running at a speed of 160.000 rpm.

Having received energy from the working fluid, the expander 7 is driving a turbine compressor 9 connected to the expander by a shaft 10. The compressor 9 compresses the working fluid from a gaseous state to an intermediate pressure gas as part of a typical refrigeration cycle. The output fluid from the compressor 9 flows through tube 21 in to a heat exchanger 22, where thermal energy is transferred from the compressor outlet fluid to the fluid flowing through tube 5 from the heat exchanger 2. With water as a working fluid, the temperature at the compressor 9 outlet is typically 200° C., and the temperature of the solar heat exchanger 2 is around 100° C., which assures a pronounced energy transfer from the compressor 9 fluid to the heat fluid from the solar heat exchanger 2. This heat transfer is the main reason for a high cooling performance of the system.

The working fluid from the compressor 9 in conduit 23 after heat exchanger 22 and the working fluid from the expander 7 in conduit 24 are cooled in condenser 13 by ambient air before mixing through a valve 25 that takes into account possible differences in the pressure. The mixed working fluid is split into a first part that is recycled into tube 16 and into a second part which is used for evaporation in evaporator 18. Evaporator 18 is driven by compressor 9 sucking gas from evaporator 18 through tank 15. The evaporated and thereby cooled gas in evaporator 18 is used to cool an air flow 19, for example for air conditioning in a house.

The system according to the invention as described above has the advantage to work efficiently even with an external heater at a low temperature of 100° C. or less.

Figure 4:
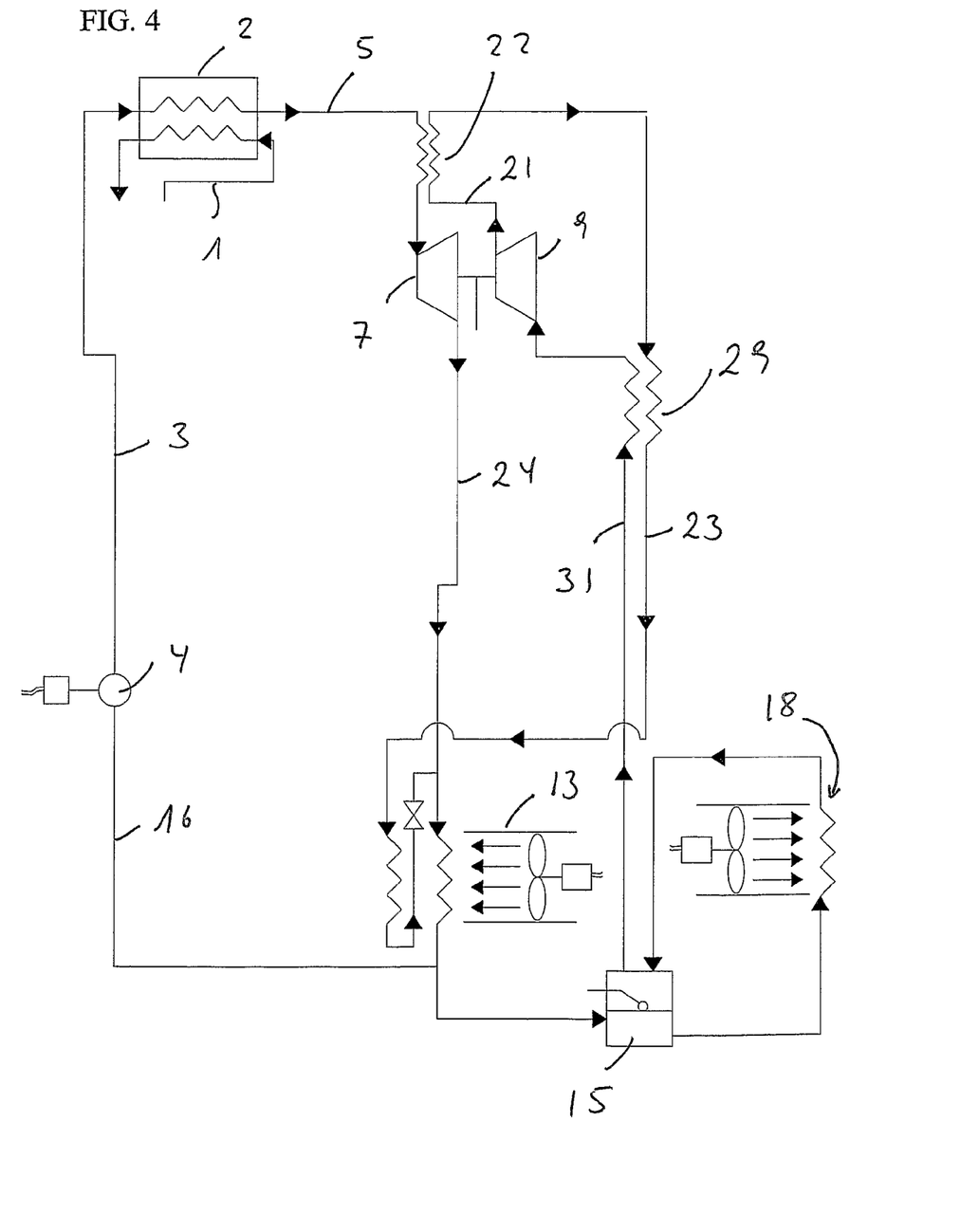
FIG. 4 is a diagram of a system according to the invention with one stage expander, where the compressor exit fluid heats the compressor entrance fluid.

FIG. 4 illustrates an alternative embodiment, where the difference from the system of FIG. 3 is provision of a heat exchanger 29 between the outlet fluid from the compressor 9 in tube 23 and the inlet fluid of the compressor 9 in tube 31. This stage recovers energy for the liquid fluid cycle.

Figure 5:
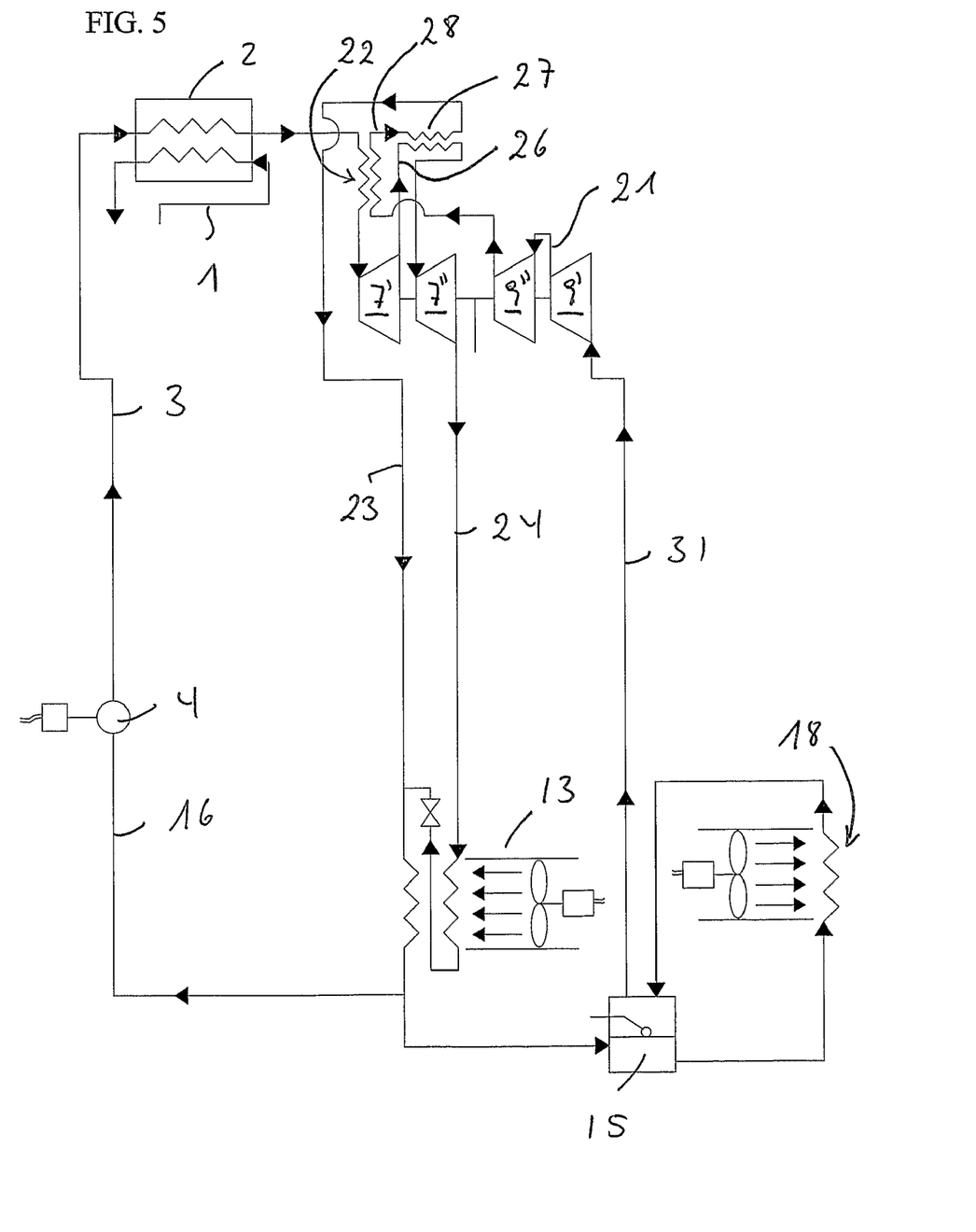
FIG. 5 is a diagram of a system according to the invention with a two stage expander and a two stage compressor.

Another improvement can be achieved by using a double expander 7', 7" and double compressor 9', 9" as illustrated in FIG. 5. The flow in conduit 21 from the exit of the first compressor 9' is fed into the second compressor stage 9". The flow from the exit of second compressor stage 9" is fed into heat exchanger 22 for heat energy transfer to the flow in conduit 5 from the solar heat exchanger 2. The flow from the heat exchanger 22 is fed into the first stage 7' of the expander. The exit flow from the first expander stage 7' in conduit 26 is fed into a second heat exchanger 27 in order to receive thermal energy. This energy is received from the flow in conduit 28 after the heat exchanger 22. The advantage is a further energy transfer from the compressed fluid to the expanded fluid, as the expansion in the first expander stage 7' reduces the temperature of the working fluid making it ready for another heat take-up.

Figure 6:
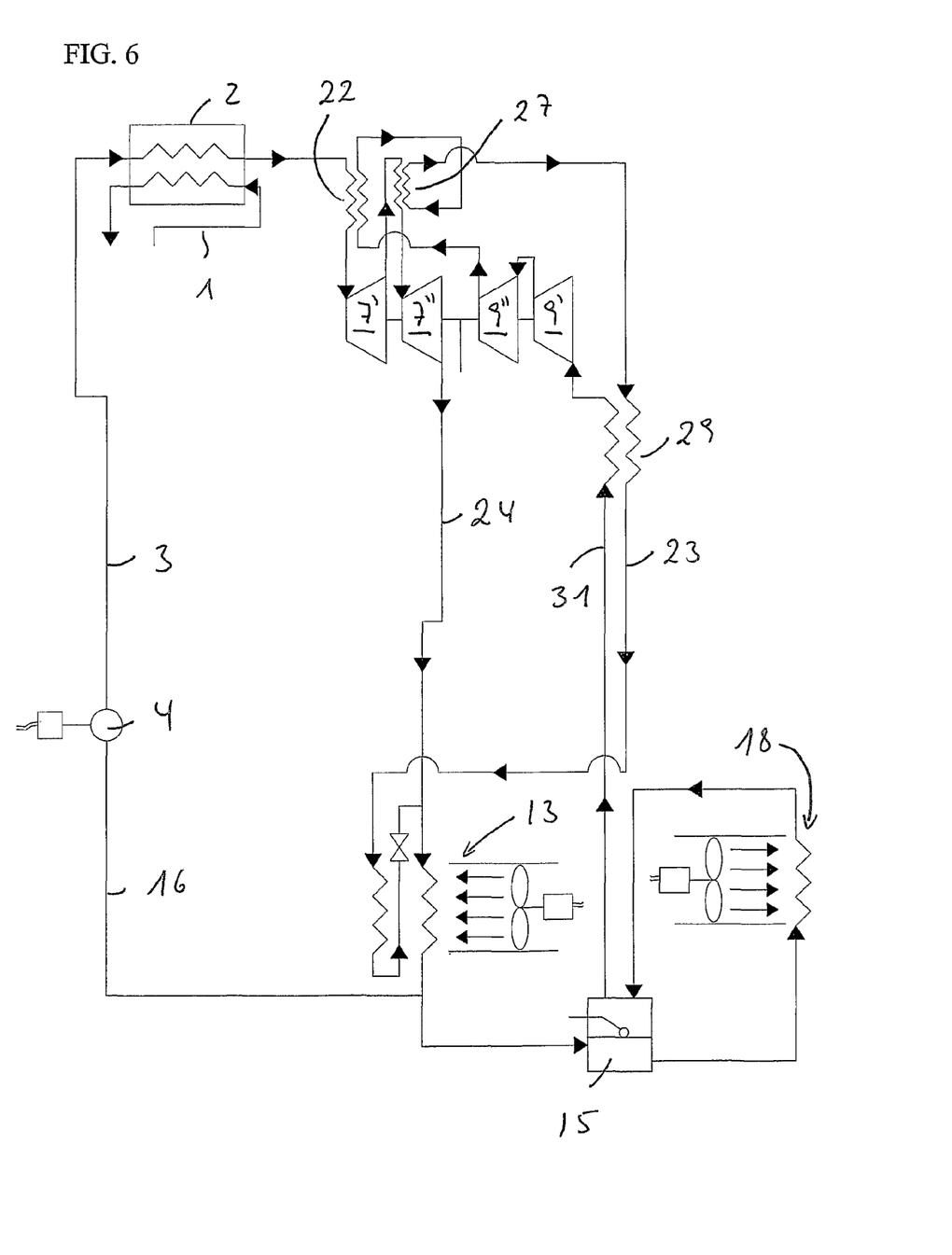
FIG. 6 is an alternative embodiment with a two stage expander and a two stage compressor, where the compressor exit fluid heats the compressor entrance fluid.

FIG. 6 illustrates an alternative embodiment, where the difference from the system of FIG. 5 is provision of a heat exchanger 29 between the outlet fluid from the second compressor stage 9" in tube 23 and the inlet fluid of the first compressor stage 9' in tube 31. This stage recovers energy for the liquid fluid cycle.

Figure 7:
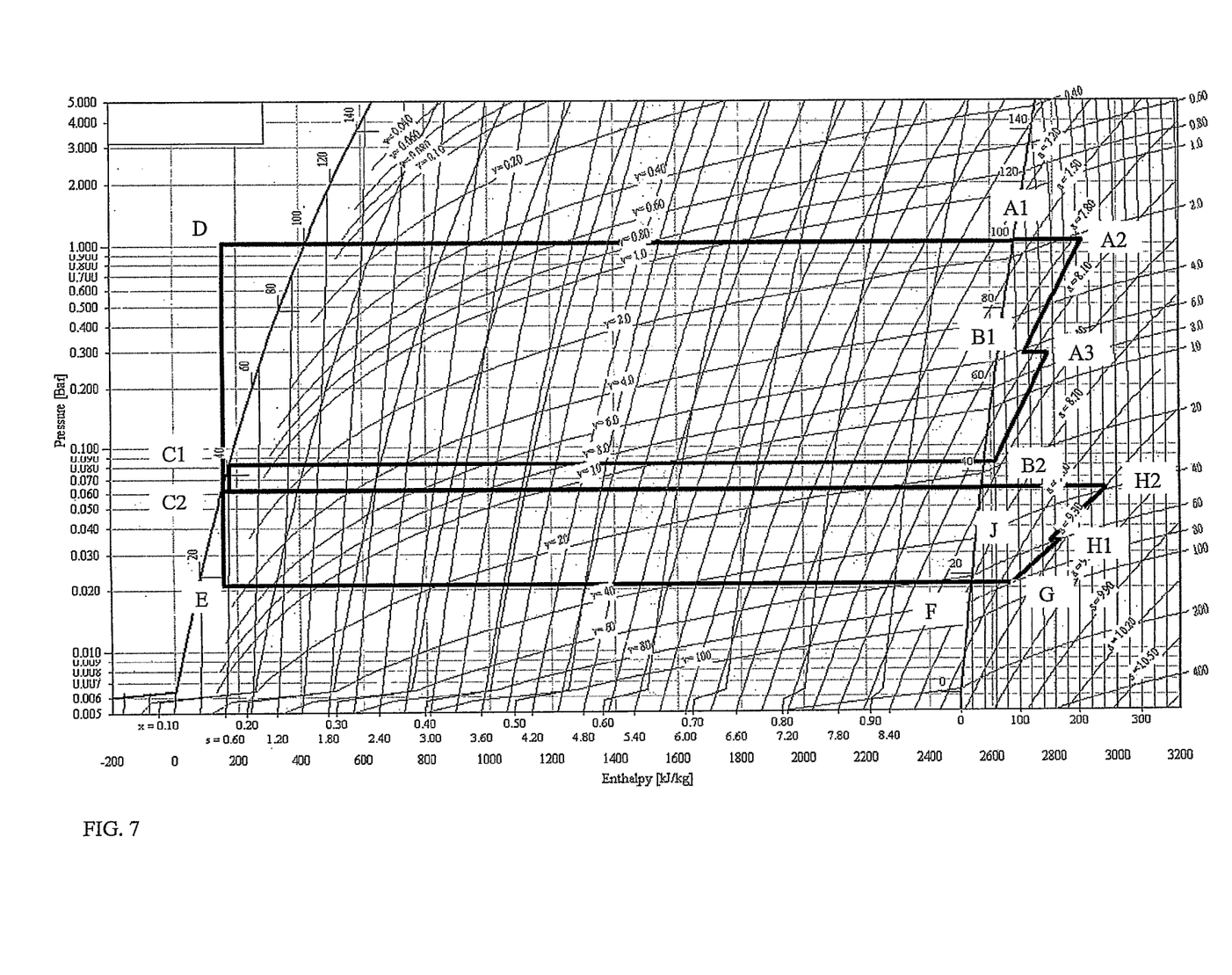
FIG. 7 is a H/log P diagram for the alternative system of FIG. 6 with water (R718) as a working fluid.

This working diagram ABCD of the system of FIG. 6 is illustrated in FIG. 7. At atmospheric pressure, the working fluid water is heated to 100° C. (A1) in the solar heater and further to just above 200 degrees (A2) by the heat exchanger 22. During expansion to B1, energy is transferred to first expander stage 7'. In the second heat exchanger 27, heat is transferred to the gas from point B1 to point A3. The expansion in the second expander stage 7" is illustrated by the diagram line between A3 and B2 where the working fluid by ambient air is cooled down to around 42° C. The condenser 13 reduces the enthalpy to point C, where part of the split working fluid enters the heating cycle back to point D after the pump 4, and where another part of the working fluid goes to the air condition cycle starting at C2.

From the starting point of C2, the working liquid enters tank 15, where the pressure drops to point E. By evaporation in evaporator 18, until phase change at point F. Heat exchanger 29 is reflected by the line between point F and G. The lines between G and H1 and H1 to H2 via point J reflect the two compressor stages 9' and 9". The line from H2 to C2 illustrates the steps of heat exchange in heat exchangers 22, 27, and 29 and the condenser 13.

Figure 8:
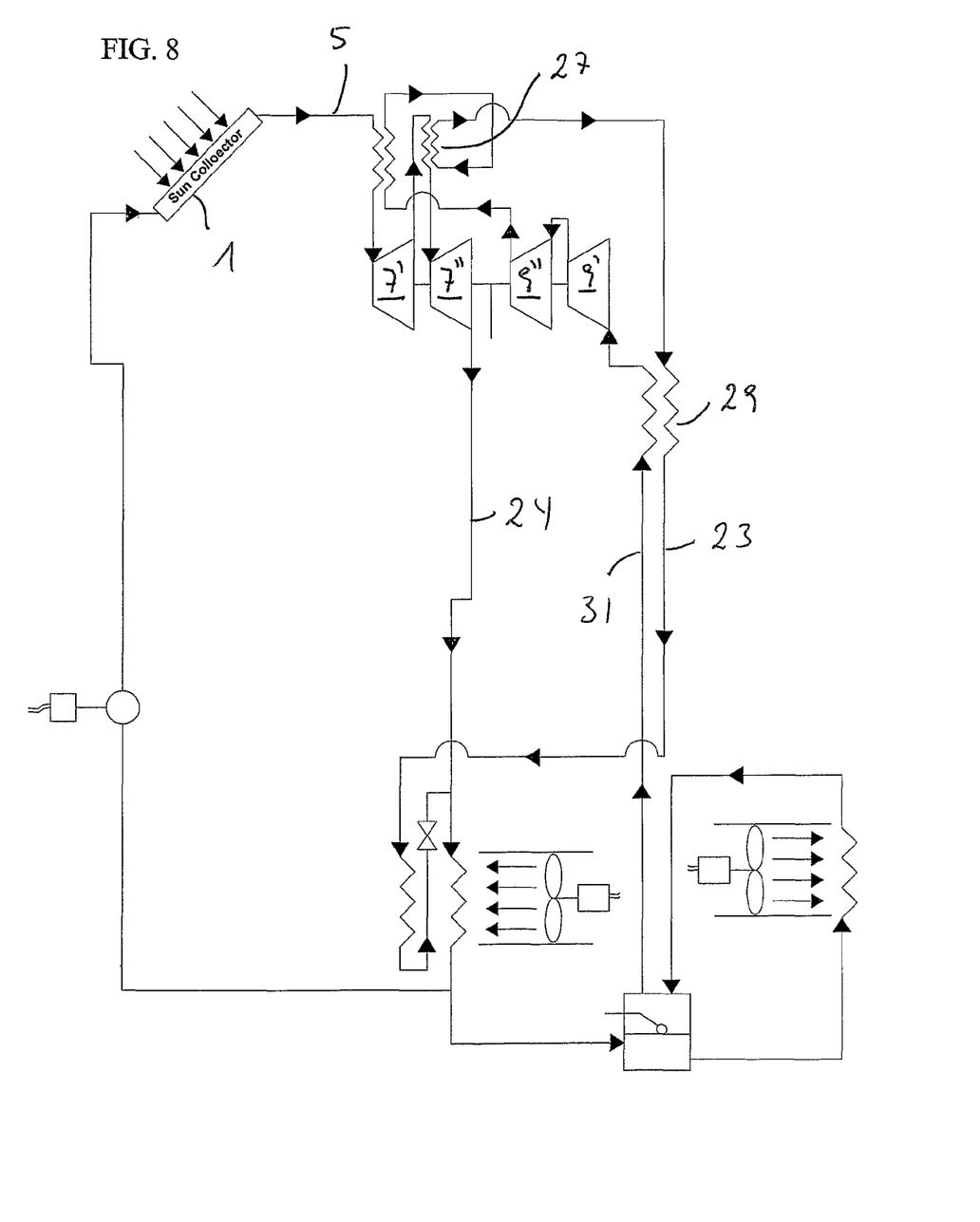
FIG. 8 is a further embodiment, where the external heater is a solar heater.

The heat exchanger system 2 between the fluid conduits 3 and 5 for receiving thermal energy from an external heating source may be provided as a solar heater 1, which his illustrated in FIG. 8. It should be mentioned that it is only of optional nature to use remaining heat in conduit 23 from the exit flow of heat exchanger 27 to pre-heat the flow in conduit 31 before entering the first stage 9' of the compressor.

Figure 9:
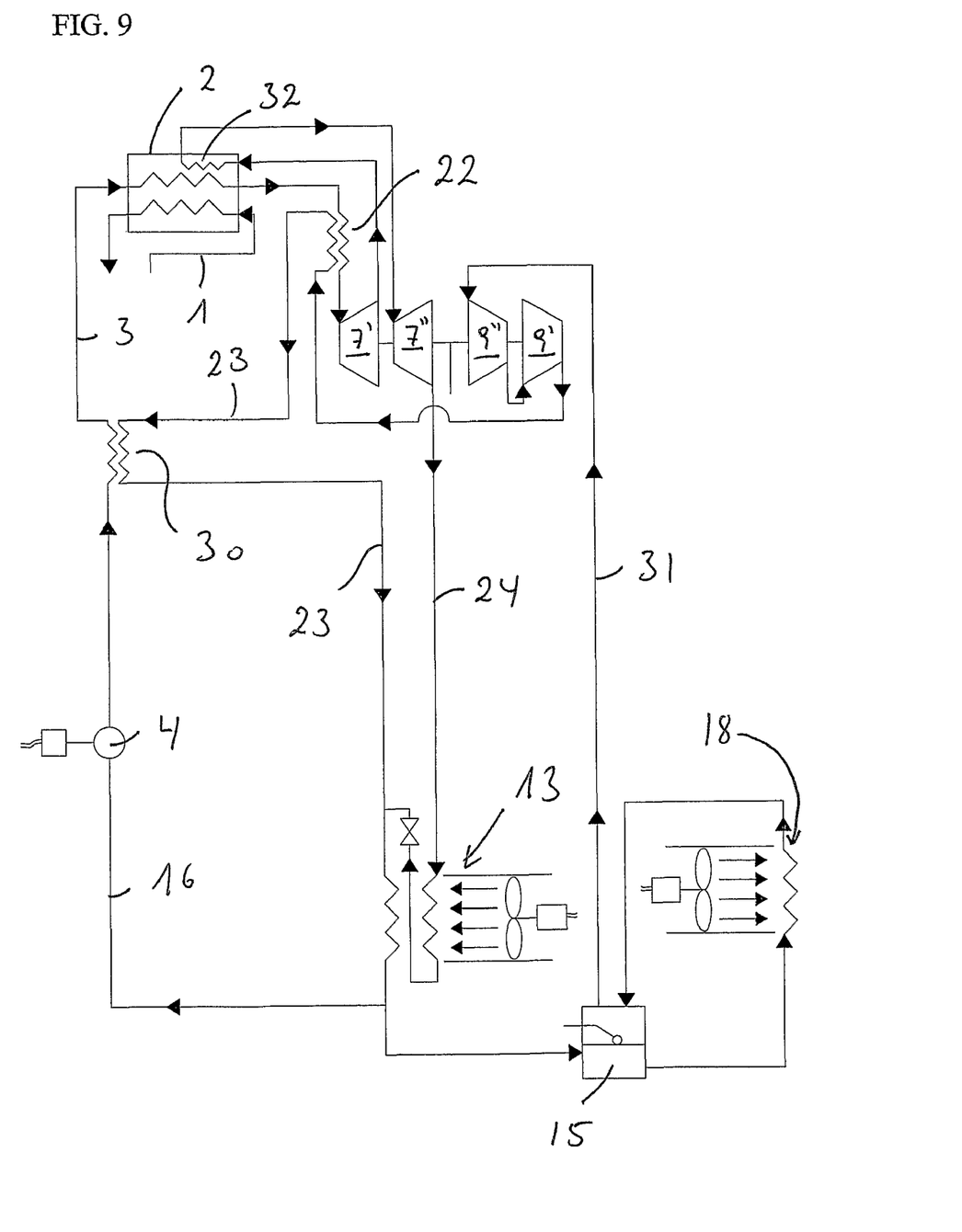
FIG. 9 is an even further embodiment, where the compressor exit fluid is used as a pre-heating stage of the working fluid before entrance into the external heater

A further embodiment is illustrated in FIG. 9, where the compressor outlet fluid connection 23 comprises a further heat exchanger 30 for transfer of heat from the fluid connection 23 to the fluid in the fluid connection 3 as a pre-heater before the entrance into the external heater system 2. Furthermore, in case that the expansion in the expander 7 has decreased the temperature in the working fluid to below the temperature as provided by the external heating source 1 in the heat exchanger 2, the working fluid may be heated by the external heat source in a further heat exchanger 32 between the two stages 7', 7" of the expander.

In contrast to U.S. Pat. No. 6,581,284, where the compressor 9 compresses the working fluid from a low pressure gas to a pressure equal to the outlet of the first heat exchanger, this is not necessary in a system according to the invention. First of all, a pressure reduction valve is used in order to combine the working fluid in the two connections 23 and 24. In addition, the high pressure from the compressor is reduced due to the heat exchangers 22, and optionally heat exchangers 27, 29, 30 and/or 32.

Figure 10:
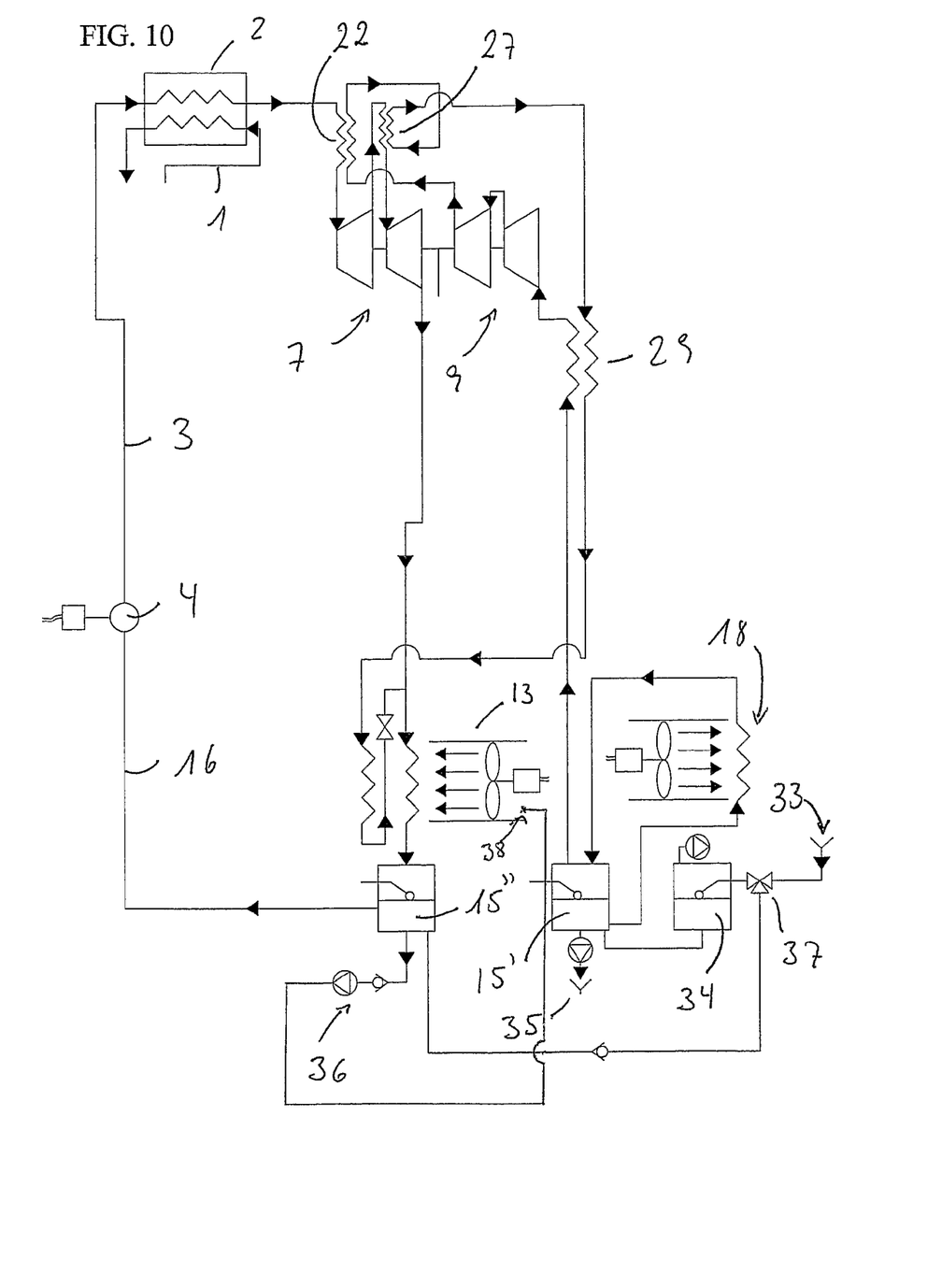
FIG. 10 illustrates the application in the form of a distiller where the distillated water is used for spraying to raise the condenser efficiency.

FIG. 10 illustrates the invention where distillated water is produced with the purpose to humidify and thereby cool the inlet air to the condenser. The water to be distilled is provided in liquid inlet 33, which enters intermediate tank 34 before entering the cooling cycle through tank 15'. This liquid to be distilled will be mixed with clean distilled liquid from tank 15" through valve 37 or used to cool the condenser. Evaporated working liquid from tank 15' enters the compressor 9, leaving a liquid in tank 15' which is enriched in waste products. These waste products may be drained through drainage system 35. Condensed working liquid from the expander 7 and compressor 9 is gathered in tank 15" from which there may be drained distilled liquid, such as water through drainage system 36 only to be used in a spray system 38 to cool the inlet air to the condenser.

The invention claimed is:

1. An apparatus for cooling, comprising
a liquid pump (4) transporting fluid through a heating cycle (5, 7, 24, 16, 4, 3),
an external heat source (1, 2) heating the fluid in the heating cycle (5, 7, 24, 16, 4, 3),
an expander (7) with an expander inlet and an expander outlet, the expander inlet having a fluid connection (5) to the external heat source (1, 2) for receiving fluid from the heat source in the gas phase to drive the expander (7) by expanding the fluid,
a compressor (9) with a compressor inlet and a compressor outlet, the compressor being driven by the expander (7) for compressing working fluid from a low pressure compressor inlet gas to a high pressure compressor outlet gas,
a first heat exchanger (22) with a fluid connection (21) to the compressor outlet and connected to the expander inlet, the first heat exchanger transferring heat from the high pressure compressor outlet gas to the fluid in the heating cycle,
a second heat exchanger (13) with a condenser condensing the working fluid from the expander by energy transfer to a second fluid of lower temperature,
a third heat exchanger (18) including an evaporator evaporating the working fluid from the second heat exchanger (13) by energy transfer from a third fluid (19) and creating a desired cooling effect in the third fluid (19),
wherein the first heat exchanger (22) is connected to the fluid connection (5) as part of the heating cycle between the external heat source (1, 2) and the expander (7) inlet transferring heat from the high pressure outlet gas to the fluid flowing in fluid connection (5) from the external heat source (1,2).

2. An apparatus according to claim 1, wherein the first heat exchanger (22) is configured for increasing the temperature of the fluid from the external heat source (1, 2).

3. An apparatus according to claim 2, wherein the increasing of the temperature is adapted for changing the working fluid from the liquid phase to the gas phase.

4. An apparatus according to claim 1, wherein the working fluid is water.

5. An apparatus according to claim 1, wherein the expander has at least a first expander stage (7') and a second expander stage (7"), and there are provided heating means for transfer of heat to the gaseous fluid between the first (7') and the second (7") expander stage.

6. An apparatus according to claim 1, wherein the compressor has at least a first compressor stage (9') and a second compressor stage (9").

7. An apparatus according to claim 5, wherein the heating means is a fourth heat exchanger (27) having a downstream fluid connection (28) to the first heat exchanger (22).

8. An apparatus according to claim 1, wherein an expander outlet fluid connection (24) to the outlet of the expander (7) and a compressor outlet fluid connection (23) to the outlet of the compressor (9) are mutually connected though a pressure reduction valve (25).

9. An apparatus according to claim 8, wherein the valve is connected to the expander outlet fluid connection (24) downstream of the second heat exchanger (13), and wherein the pressure reduction valve is connected to the compressor outlet fluid connection (23) upstream of the second heat exchanger (13).

10. An apparatus according to claim 1, wherein an additional heat exchanger is provided for heat transfer from the fluid at the outlet of the compressor (9) to the fluid at the inlet of the compressor (9).

11. An apparatus according to claim 1, wherein the external heat source (1, 2) comprises a solar heater (1).

12. An apparatus according to claim 11, wherein the solar heater (1) is configured to provide a temperature to the fluid in the fluid cycle between 70° C. and 120° C.

13. An apparatus according to claim 11, wherein the solar heater (1) is a solar collector configured to provide a temperature to the fluid in the fluid cycle of up to 500° C.

14. An apparatus according to claim 1, wherein the pressure of the working fluid in the heating cycle before the expander (7) is less than 2 atmospheres.

15. An apparatus according to claim 14, wherein the pressure of the working fluid in the heating cycle before the expander (7) is in the order of atmospheric pressure.

16. An apparatus according to claim 1, wherein an additional heat exchanger (30) is provided for heat transfer between the compressor (7) outlet fluid connection (21, 23) and the working fluid upstream of the external heat source (1, 2).

17. An apparatus according to claim 1, wherein the expander and/or the compressor may be of the axial or radial type of turbine or of a type combining the two principles.

18. An apparatus according to claim 17, wherein the expander has a rotational speed between 50,000 and 250,000 rpm.

19. Application of an apparatus according to claim 1 for distilling water used to humidify the air to the condenser (13).

* * * * *